(12) United States Patent
Carter et al.

(10) Patent No.: US 6,832,026 B2
(45) Date of Patent: Dec. 14, 2004

(54) OPTICAL FIBER HAVING HIGH TEMPERATURE INSENSITIVITY OVER A TEMPERATURE RANGE CENTERED ON A SELECTED TEMPERATURE AND METHOD OF MAKING SAME

(75) Inventors: Adrian Carter, Bulli (AU); Nils Jacobson, North Granby, CT (US); Kanishka Tankala, South Windsor, CT (US); Julia Farroni, Windsor, CT (US)

(73) Assignee: Nufern, East Granby, CT (US)

( * ) Notice: Subject to any disclaimer, the term of this patent is extended or adjusted under 35 U.S.C. 154(b) by 0 days.

(21) Appl. No.: 10/200,664

(22) Filed: Jul. 22, 2002

(65) Prior Publication Data

US 2003/0086648 A1 May 8, 2003

Related U.S. Application Data

(60) Provisional application No. 60/380,582, filed on May 14, 2002, and provisional application No. 60/306,914, filed on Jul. 20, 2001.

(51) Int. Cl.[7] .................................................. G02B 6/34
(52) U.S. Cl. ........................ 385/37; 385/123; 385/141; 385/142; 385/144
(58) Field of Search .......................... 385/37, 123, 141, 385/142, 144

(56) References Cited

U.S. PATENT DOCUMENTS

| | | | |
|---|---|---|---|
| 3,699,472 A | 10/1972 | Young | 331/94.5 |
| 4,025,156 A | 5/1977 | Gloge et al. | 385/124 |
| 4,106,850 A | 8/1978 | Marcatili | 385/124 |
| 4,111,525 A | 9/1978 | Kaminow et al. | 385/124 |
| 4,165,223 A | 8/1979 | Powers | 65/2 |
| 4,277,270 A | 7/1981 | Krohn | 65/3 |
| 4,358,181 A | 11/1982 | Gulati et al. | 385/124 |
| 4,432,606 A | 2/1984 | Blair | 385/128 |
| 4,482,205 A | 11/1984 | Lagakos | 385/123 |
| 4,636,031 A | 1/1987 | Schmadel, Jr. et al. | 385/37 |

(List continued on next page.)

FOREIGN PATENT DOCUMENTS

| | | | |
|---|---|---|---|
| EP | 0141038 A2 | 5/1985 | G02B/6/04 |
| EP | 0300471 A1 | 1/1989 | G02B/6/10 |
| EP | 0569182 A1 | 11/1993 | G02B/6/16 |
| EP | 0607990 A1 | 7/1994 | G02B/6/38 |
| EP | 0800098 A2 | 10/1997 | G02B/6/16 |
| EP | 1081386 A1 | 12/2000 | G02B/6/16 |
| GB | 2246234 A | 1/1992 | H01S/3/00 |
| WO | WO 93/18420 | 9/1993 | G02B/6/16 |
| WO | WO 94/00784 | 1/1994 | G02B/6/16 |

OTHER PUBLICATIONS

J.B. Judkins et al., "Temperature–insensitive long–period fiber gratings", OFC '96, Mar. 1996, Postdeadline papers.
K. Shima et al., "A novel temperature–insensitive long–period fiber grating using a boron–codoped–germano–silicate–core fiber", OFC '97, Mar. 1997 Technical Digest, p. 347–348.
D.L. Williams et al., "Enhanced Photosensitivity in Germania Doped Sillica Fibers for Future Optical Networks", Proceed. of 18th European Conference on Optical Communications, vol. 1, Sep. 27, 1992, Berlin, Germany.

(List continued on next page.)

Primary Examiner—Brian Healy
Assistant Examiner—Daniel Petkovsek
(74) Attorney, Agent, or Firm—McCormick, Paulding and Huber LLP; Donald Huber; Peter J. Rainville (57) ABSTRACT

An optical fiber for use in making components of an optical communication system has cladding and core materials the constituents of which cause a component made from the fiber to have a rate of change with respect to temperature of a response to a signal which passes through zero at a temperature $T_m$ which is at or near a selected temperature, or falls within a selected temperature range; and the value of $T_m$ of a fiber can be controllably changed by changing the concentration of $B_2O_3$ in the fiber core material.

27 Claims, 5 Drawing Sheets

U.S. PATENT DOCUMENTS

| | | | | |
|---|---|---|---|---|
| 4,637,686 | A | | 1/1987 | Iwamoto et al. ............ 385/128 |
| 4,768,859 | A | | 9/1988 | Kasori et al. ................. 350/34 |
| 4,923,278 | A | | 5/1990 | Kashyap ..................... 385/128 |
| 4,975,102 | A | * | 12/1990 | Edahiro et al. ............... 65/391 |
| 4,979,971 | A | | 12/1990 | Kyoto et al. ..................... 65/3 |
| 5,011,251 | A | | 4/1991 | Miller et al. .................. 385/43 |
| 5,018,827 | A | | 5/1991 | Brownrigg .................. 385/123 |
| 5,059,475 | A | | 10/1991 | Sun et al. .................... 428/195 |
| 5,064,266 | A | | 11/1991 | Sun et al. .................... 385/132 |
| 5,127,928 | A | | 7/1992 | Farries et al. ..................... 65/2 |
| 5,295,205 | A | | 3/1994 | Miller et al. ................... 385/1 |
| 5,295,209 | A | | 3/1994 | Huber ......................... 385/37 |
| 5,367,589 | A | | 11/1994 | MacDonald et al. .......... 385/37 |
| 5,430,817 | A | | 7/1995 | Vengsarkar .................. 385/37 |
| 5,488,475 | A | | 1/1996 | Friebele et al. ............. 356/352 |
| 5,517,589 | A | | 5/1996 | Takeuchi ..................... 385/24 |
| 5,563,967 | A | | 10/1996 | Haake ......................... 385/12 |
| 5,641,956 | A | | 6/1997 | Vengsarkar et al. ... 250/227.14 |
| 5,677,920 | A | | 10/1997 | Waarts et al. .................. 372/6 |
| 5,694,503 | A | | 12/1997 | Fleming ...................... 385/37 |
| 5,703,978 | A | | 12/1997 | DiGiovanni ................. 385/37 |
| 5,708,740 | A | | 1/1998 | Cullen ......................... 385/39 |
| 5,757,540 | A | | 5/1998 | Judkins ...................... 359/341 |
| 5,949,934 | A | | 9/1999 | Shima ......................... 385/37 |
| 6,011,886 | A | | 1/2000 | Abramov ..................... 385/37 |
| 6,044,189 | A | | 3/2000 | Miller ......................... 385/37 |
| 6,058,231 | A | | 5/2000 | Haggans et al. ............. 385/37 |
| 6,097,862 | A | * | 8/2000 | Abramov et al. ............. 385/37 |
| 6,101,301 | A | * | 8/2000 | Engelberth et al. ........... 385/37 |
| 6,108,470 | A | | 8/2000 | Jin et al. ...................... 385/37 |
| 6,112,553 | A | | 9/2000 | Poignant ........................ 65/41 |
| 6,144,789 | A | | 11/2000 | Engelberth ................... 385/37 |
| 6,147,341 | A | | 11/2000 | Lemaire ................ 250/227.17 |
| 6,148,128 | A | | 11/2000 | Jin .............................. 385/37 |
| 6,151,156 | A | | 11/2000 | Adlerfligel .................. 359/337 |
| 6,181,851 | B1 | | 1/2001 | Pan ............................. 385/37 |
| 6,201,918 | B1 | | 3/2001 | Berkey ....................... 385/128 |
| 6,314,222 | B1 | * | 11/2001 | Jang et al. .................... 385/37 |
| 6,400,884 | B1 | * | 6/2002 | Matano et al. .............. 385/137 |
| 6,463,684 | B2 | * | 10/2002 | Jang .............................. 38/37 |
| 6,487,340 | B2 | * | 11/2002 | Enomoto et al. ............. 385/37 |
| 6,584,248 | B2 | * | 6/2003 | Franzen et al. ............... 385/37 |

OTHER PUBLICATIONS

A.M. Vengsarkar et al., "Long–Period Fiber Gratings as Band–Rejection Filters", Journal of Lightwave Technology, vol. 14, No. 1, Jan. 1996, p. 58–65.

G. Meltz et al., "Bragg grating formation and germanosilicate fiber photosensitivity", SPIE vol. 1516 International Workshop on Photoinduced Self–Organization Effects in Optical Fiber (1991), p. 185–199.

W. Vogel, "Optical Properties of Oxide Glasses", Optical Properties of Glass. Ed. by D.R. Uhlman & N.J. Kreidi, 1991.

D.L. Williams et al., "Accelerated lifetime tests on UV written intra–core gratings in boron germania codoped sillica fiber", Electronics Letters, Nov. 23, 1995, vol. 31, No. 24, p. 2120–2121.

T. Baak, "Thermal Coefficient of Retractive Index of Optical Glasses", Journal of the Optical Society of America, vol. 59, No. 27, p. 851–857.

D.L. Williams et al., "Enhanced UV Photosensitivity In Boron Codoped Germanosilicate Fibres", Electronics Letters, Jan. 7, 1993, vol. 29, No. 1, p. 45–47.

A.K. Chu et al., "Multilayer dielectric materials of SiOx/Ta2O5/SiO2 for temperature–stable diode fasers", Materials Chemistry and Physics 42 (1995) 214–218.

G.W. Yoffe et al., "Temperature–compensated optical–fiber Bragg gratings", OFC '95 Technical Digest, Mar. 1995, p. 134–135.

D.L. Williams et al., "Temperature Stable 1.3um Laser with Bragg Fibre Grating External Cavity for Access Networks", Proceedings of the European Conference on Optical Communications, Sep. 12–16, 1993 Ragular Papers, vol. 2, No. conf 19, p. 209–212.

D.L. Williams et al., "Broad Bandwidth Highly Reflecting Gratings Formed in Photosensitive Boron Codoped Fibres", Sep. 27, 1992, p. 923–926.

R. Kashyap, "Photosensitive Optical Fibers: Devices and Applications", Optical Fiber Technology, vol. 1, No. 1, 1994, p. 17–34.

M. Wilkinson et al., "O–Fibre Filter for Erblum Gain Spectrum Flattening", Electronics Letters, vol. 28, No. 2, Jan. 16, 1992, p. 131–132.

K. Simmons et al., "Photosensitivity of solgel–derived germanosilicate planar waveguides", Optical Letters, Jan. 1, 1993, vol. 18, No. 1, p. 25–27.

R. Kashyap et al., "Laser–Trimmed Four–Port Bandpass Filter Fabricated In Single–Mode Photosensitive Co–Doped Planar Waveguide", IEEE Photonics Technology Letters, vol. 5, No. 2, p. 191–194.

G.W. Yoffe et al., "Passive temperature–compensating package for optical fiber gratings", Applied Optics, Oct. 20, 1996, vol. 34, No. 30, p. 6859–6861.

Y.–J. Kim et al., "Measurement of refractive–index variation with temperature", Optics Letters, Aug. 1, 2002, vol. 27, No. 15, p. 1297–1299.

K. Shima et al., "Temperature insensitive Long–Period Fiber Grating", Fujikura Technical Review, 1998, p. 1–2.

Shima et al.; "A novel temperature–insensitive long–period fiber grating using a boron–codoped–germanosilicate–core fiber"; OFC '97 Technical Digest; pp. 347–348.*

Julia Farroni, Kanishka Tankala, Adrian Carter and Nils Jacobson; Utility Patent Application No. 10/436,623 filed May 13, 2003, "Method of Providing an Optical Fiber Having a Minimum Temperature Sensitivity at a Selected Temperature" (copy of application as filed including claims).

* cited by examiner

OPTICAL FIBER HAVING HIGH TEMPERATURE INSENSITIVITY OVER A TEMPERATURE RANGE CENTERED ON A SELECTED TEMPERATURE AND METHOD OF MAKING SAME

CROSS-REFERENCE TO RELATED APPLICATIONS

This application claims priority to Provisional patent application Ser. No. 60/306,914, filed Jul. 20, 2001 and entitled "Temperature Insensitive Optical Communication Fiber, Method For Making The Fiber, and Devices Made From the Fiber", and also claims priority to Provisional patent application Ser. No. 60/380,582, filed on May 14, 2002, and which is entitled "Optical Fiber Having High Temperature Insensitivity Over A Temperature Range Centered On A Selected Temperature And Method Of Making Same". Both of the foregoing Provisional patent applications are incorporated herein by reference.

FIELD OF THE INVENTION

The invention relates to an optical fiber for use in making various fiber devices, such as long-period gratings, of optical communication systems, and deals more particularly with an improved fiber and fiber devices having improved performance in response to changes in temperature. The invention also relates to methods for making such optical fiber and fiber devices.

BACKGROUND OF THE INVENTION

In the development of fiber optic communication systems it has been found possible and often desirable to form certain circuit components or devices with the fibers themselves. Known in the art are amplifiers, couplers, lasers and filters formed with optical fibers. For example, a filter can be formed by introducing a periodic structure, such as a grating to the fiber. It is known to form a filter, such as, for example, a Bragg grating filter, by controllably varying the index of refraction of the core, and also possibly the index of refraction of the cladding layer immediately surrounding the core, along the length of the fiber. In particular, photosensitive fibers are known wherein at least the core of the fiber includes dopant materials allowing the initial or base index of refraction of the core to be changed from its base value to some other value by the application of actinic radiation to the fiber, and it is also known to form a Bragg filter or grating in such a photosensitive fiber by changing the index of refraction of the core from its base value at a plurality of spaced points along the length of the core, which points of changed index then reflect or reject light of a wavelength which resonates with the points of changed index. As another example, it is also known to form a filter by periodically thinning the fiber with a microburner, as is described in U.S. Pat. No. 5,708,740, issued on Jan. 13, 1998 and assigned to Northern Telecom Limited.

In the making and use of fiber optic system components from specialty fibers it is known that the components customarily have response characteristics dependent on the temperature at which the components are used.

To obtain fixed responses despite varying environmental temperatures various complex and expensive solutions have been proposed in the past, such as housing the components in temperature controlled containers or adding temperature sensitive mechanical stressing features to the fiber. Other attempts at solving the problem have been directed to the selection and proportioning of the constituents of the core and cladding materials of fibers, used in making the components, whereby components made from the fibers inherently have good temperature insensitivity and can hopefully be used in many applications without the need for temperature controlled containers, stressing mechanisms or the like.

In regard to optical communication fibers with filters as described above, it has been found that such filters made in the past have a peak transmission loss wavelength which varies with temperature, and therefore if the operating temperature of the filter changes significantly the ability of the filter to efficiently reject or pass the wavelength(s) for which it was designed becomes impaired. In certain components or devices this problem can arise because the time required for light of a given wavelength to move from one point to another along the length of the core varies with the temperature, with the result that with changes in temperature the light of the wavelength to be rejected or passed by the filter loses its exact resonance with the spaced points of changed refractivity and causes the points of changed refractivity index to reflect or transmit light of the given wavelength with less efficiency.

Prior efforts toward providing an optical fiber with high temperature insensitivity by core and cladding constituent control are revealed by U.S. Pat. Nos. 5,703,978, 5,949,934 and 6,201,918. These patents suggest that changes with respect to temperature of a long-period grating filter made from a given fiber are directly related to changes in the fiber's effective refractive index $n_{eff}$ with respect to temperature. These patents still further suggest that a fiber with high temperature insensitivity can be made by formulating the constituents of the core and cladding materials such that the characteristic curve of the core index vs. temperature and the characteristic curve of the cladding index with respect to temperature have substantially the same shape (see FIG. 5 of the '978 patent) so that at every reasonable temperature the rate of change of the core index, $$\frac{dn_{core}}{dT},$$

is equal to the rate of change of the cladding index, $$\frac{dn_{clad}}{dT},$$

to accordingly make the rate of change of the fiber effective index acceptably low or zero at all temperatures.

In regard to the disclosures of the foregoing patents, applicants have found that it is impractical, and perhaps impossible, to in all cases formulate core and cladding materials such that a grating or other device made with the fiber has the requisite temperature performance.

Accordingly, it is an object of the present invention to address one or more of the foregoing disadvantages or deficiencies of the prior art.

SUMMARY OF THE INVENTION

In one aspect, the invention resides in the finding by applicants that for a fiber having a core co-doped with selected constituents, such as, for example, germanium and boron, the temperature sensitivity characteristic of a long period grating formed in the fiber core, as expressed by a plot of the absolute change in grating wavelength vs. temperature, is a characteristic curve having a temperature $T_m$ at which the sensitivity of the grating wavelength (i.e., the wavelength at which the transmission loss through the grating is a maximum, also referred to as $\lambda_B$) to changes in temperature is a minimum (e.g., the slope of the curve is zero), with the curve increasing smoothly with both increases and decreases in temperature away from the temperature $T_m$.

Another aspect of the invention resides in that applicants have found that by controlling the constituents of the core and cladding materials of a fiber in certain ways the characteristic temperature $T_m$ can be made to fall at any desired temperature within a useful range of temperatures for the fiber. U.S. Pat. No. 6,201,918 shows, in FIG. 6, a grating having a $T_m$ lying within a range of $-5°$ C. to $+5°$ C., and an article entitled *Temperature Insensitive Long-Period Fiber Grating* by K. Shima, S. Okude, T. Sakai, A. Wada, and R. Yamauchi in Fujikura Technical Review 1998, pages 1 & 2, shows, in FIG. 2, a grating having a $T_m$ lying within a range of $+15°$ C. to $+25°$ C. Neither of these publications, however, suggests the idea of intentionally controlling the constituents of the core and cladding materials to cause the $T_m$ of a fiber, or of a grating or other optical system component made from the fiber, to fall at a wanted temperature, and especially no suggestion is made for intentionally causing the $T_m$ of a fiber to fall at a useful temperature of the fiber not within the range of $-5°$ C. to $+5°$ C. or the range of $+15°$ C. to $+25°$ C.

In keeping with the above, the invention resides in part in an optical fiber for use in making optical communication system components, especially long-period gratings, in said components, and in the method for making such fiber and components, wherein the core material and the cladding material of the fiber are so formulated that their characteristic curves of index vs. temperature are of dissimilar shapes and yet are such that at a selected temperature, which may be approximately the mean or average temperature at which a component made from the fiber is expected to be used, the curves of rate of change of index with respect to temperature of the core $$\left(i.e., \frac{dn_{core}}{dT} \text{ vs. } T\right)$$

and the cladding $$\left(i.e., \frac{dn_{clad}}{dT} \text{ vs. } T\right)$$

materials cross one another (and are therefore equal to one another), or at least have a minimum difference, at approximately the selected temperature; and as a result of this the rate of change of the effective index of the fiber is acceptably low or zero at the above-mentioned temperature $T_m$, which is equal to the selected temperature, and throughout a substantial range of temperatures extending both below and above the selected temperature.

In another aspect, the invention resides in the method of making an optical fiber with high temperature insensitivity by first making a fiber having regions of core material and cladding material which materials are formulated with the expectation that a fiber drawn from the preform may have characteristic curves of core index vs. temperature and cladding index vs. temperature of such shape that the curves representing the rate of change of these characteristic curves will cross one another or will have a minimum difference at or near the selected temperature, then testing the responsiveness of the fiber, or of a component made from the fiber, to inputs over a range of temperatures including the selected temperature, surmising from this testing how the constituents of the core material and/or of the cladding material are to be changed to have the their rate of change curves cross one another or have a minimum difference at a point closer to the selected temperature, making a new fiber in accordance with the surmise and then repeating these steps, if necessary, until acceptable formulations for the cladding and core materials are found.

Still further, another aspect of the invention resides in applicants having discovered that, for reasonable ranges of temperatures, say from $-20°$ C. to $90°$ C., after having made a preliminary fiber with a certain composition of cladding constituents, such as silicon dioxide ($SiO_2$), phosphorus pentoxide ($P_2O_5$), and fluorine(F), and a certain composition of core constituents, such as silicon dioxide, germanium dioxide ($G_eO_2$), and boron trioxide ($B_2O_3$), and after having measured the $T_m$ of that preliminary fiber, if a new fiber is made having substantially the same compositions of constituents for its cladding and its core as the preliminary fiber, except for the concentration of $B_2O_3$ in the core, the new fiber can be made to have a $T_m$ higher than that of the preliminary fiber by making the new fiber with a greater concentration of $B_2O_3$ in its core than the preliminary fiber, or can be made to have a $T_m$ lower than that of the preliminary fiber by making the new fiber with a lesser concentration of $B_2O_3$ in its core than the preliminary fiber.

In yet a further additional aspect, the invention can reside in an optical communication fiber wherein at least the core of the fiber, and also possibly the layer of cladding immediately surrounding the core, is made such that the time required for light of a given wavelength to move between two points on the core does not change significantly over a large practical temperature range.

The invention can also reside in a communication fiber of the above-mentioned temperature insensitive type wherein at least the core, and possibly also the layer immediately surrounding the core, is photosensitive in that it has an initial or base index of refraction and is subject to having its index of refraction changed from the base value at desired points along the length of the fiber by the application of actinic radiation to the fiber at the desired points.

The invention can further reside in the fiber being one wherein the core and the cladding layer immediately surrounding the core are made of silicon dioxide with the silicon dioxide of both the core and the immediately surrounding layer including dopants which provide the fiber with its photosensitive and temperature insensitive characteristics.

The invention in more detail also resides in the specific dopants and the specific concentrations of those dopants and the specific sizes of the core and the immediately surrounding cladding used in making the fiber.

In one aspect, an optical filter is provided according to the invention. The optical filter comprises an optical fiber having a core of first light conducting material and a layer of second material disposed about the core, where the first material includes 6–10 mole percent of $GeO_2$, 1.5–3.5 mole percent of $B_2O_3$, and where the remainder mole percent- is $SiO_2$, and where the second material includes 0.5–1.0 mole percent of $P_2O_5$, 0.4–1.0 mole percent of F, and where remainder mole percent is $SiO_2$. In addition, the fiber includes a plurality of locations spaced along the length of the fiber wherein at least part of the fiber is thinned or wherein the index of refraction of at least part of the fiber has been changed via the application of actinic radiation.

The invention also resides in a method or methods for providing fibers such as those described above.

Other features of the invention will be apparent from the following disclosure, including the claims.

DESCRIPTION OF THE PREFERRED EMBODIMENTS

Figure 1:
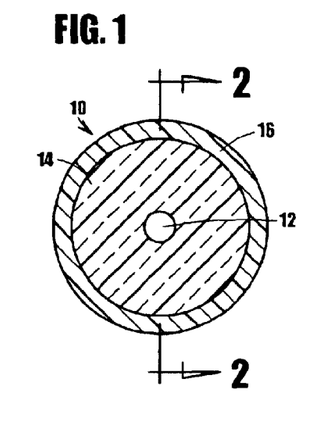
FIG. 1 is an enlarged cross sectional view taken through an optical communication fiber comprising a first embodiment of the invention.

FIG. 1 shows an optical communication fiber 10 having a cylindrical core 12 of first light transmitting material, a cladding 14 of a second light transmitting material and a protective polymer coating 16. As is well known, the first material of the core 12 has an index of refraction which is higher than the index of refraction of the second material of the cladding 14 so that light rays traveling in the core 12, upon reaching the interface between the core 12 and cladding 14, are totally internally reflected back into the core. Preferably in the making of the fiber 10, the second material of the cladding 14 is applied to the first material of the core 12 so that the interface between the core 12 and the cladding 14 is marked by a sudden change from the first material of the core 12 to the second material of the cladding 14, and thereby by a step change in the index of refraction. However, in keeping with the invention, the second material of the cladding 14 may also be applied to the first material of the core 12 in such a way as to create at the interface a gradual transition from the first material of the core 12 to the second material of the cladding 14 and therewith a gradual change in the index of refraction.

The fiber 10 can be photosensitive, as is known in the art. For example, the core 12 and optionally the cladding 14 can be made from a silica material, preferably silicon dioxide, which contains one or more dopant materials providing the core and the cladding with different base refractivities and which base refractivities can be permanently changed to other refractivities at spaced points along the length of the fiber by actinic radiation applied to the fiber in known ways at the desired points.

Figure 2:
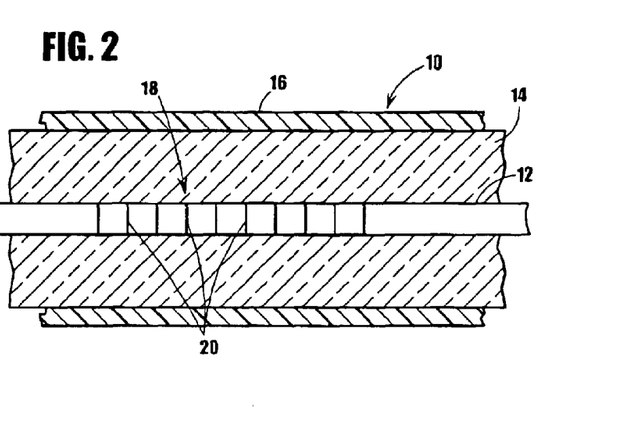
FIG. 2 is a longitudinal section view of a portion of the optical communication fiber of FIG. 1 and taken along the line 1—1 of FIG. 1, with the illustrated portion of the fiber including a filter.

FIG. 2 shows a portion of the fiber 10 of FIG. 1 in which the fiber is shown to include a filter structure 18 that includes spaced points 20 distributed along the length of the core 12. The filter structure 18 can be created as disclosed in the above-referenced U.S. Pat. No. 5,708,740 wherein the fiber 10 is selectively thinned using a microburner, and wherein the spaced points 20 represent the thinned portions of the fiber 10. Alternatively, the structure can be a Bragg filter, such as a long period Bragg grating, wherein at the spaced points 20 the index of refraction of the core 12 has been changed from its base value to some other value, such as, for example, by the application of actinic radiation. The actinic radiation which develops the points 20 of changed refractivity in the core 12 may also create changes of refractivity in the cladding 14 at the same points 20, such as for the suppression of cladding modes. Typically, most of the light passing through the fiber 10 is to be conducted by the core 12, and the changes of refractivity in the cladding 14 are of secondary importance and have been omitted from the showing of FIG. 2.

Light of a given wavelength passing through the core 12 can create a resonance with the spaced points 20 so as to cause the light to be reflected backwardly in the core 12 and will thereby prevent or reject the light from being transmitted forwardly beyond the filter structure 18.

Figure 3:
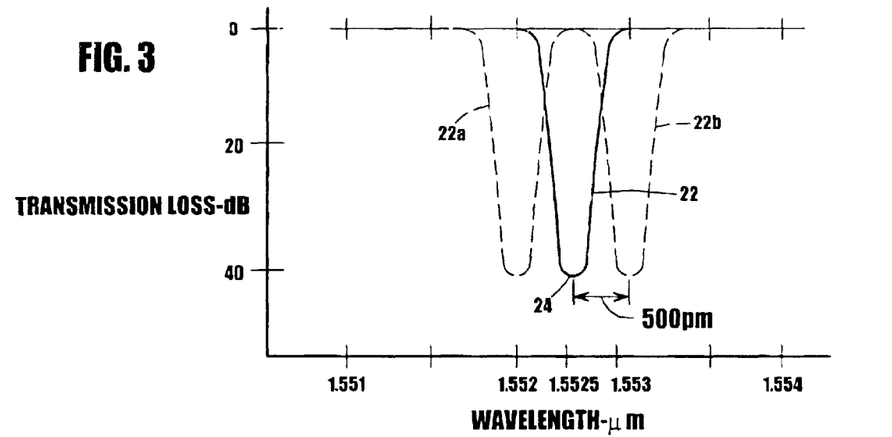
FIG. 3 is a figure wherein the solid line shows the transmission loss wavelength characteristic of the filter structure of FIG. 2, and wherein the broken lines show how such transmission loss characteristic varies with temperature in a filter structure similar to that of FIG. 2 but made using a prior art fiber.

FIG. 3 shows the transmission loss versus wavelength characteristic of a typical filter structure 18 of FIG. 2 wherein the spacing between the spaced points 20 of changed refractivity are chosen to reject and reflect light having a given wavelength of 1.5525 μm. As shown in FIG. 3 by the solid line 22, the transmission loss of the filter structure 18 remains at or close to zero for most wavelengths but at a wavelength of 1.5525 μm drops to a high loss peak 24.

As explained in more detail hereinafter, the fiber 10 is temperature insensitive in that the transmission loss characteristic of the filter structure 18 remains essentially as shown by the solid line 22 of FIG. 3 despite changes in temperature over a wide range of practical temperatures. In FIG. 3, the broken lines 22a and 22b show the way in which the transmission loss characteristic of the filter structure 18 of FIG. 2 would change with changes in temperature if the filter were embedded in a prior art fiber. That is, the broken line 22a represents the transmission loss characteristic of the prior art filter at a low temperature, the broken line 22b represents the transmission loss characteristic at a high temperature, and the solid line 22 represents the transmission loss characteristic at a temperature midway between the high and low temperatures, and of which the wavelength of peak transmission loss is the given wavelength of the light the filter was designed to reject. As shown in FIG. 2, in the case of a filter structure 18 made with a prior art fiber the wavelength of peak transmission loss of the prior art filter deviates which changes between the high and low temperatures as much as 500 picometers from the designed rejection wavelength of 1.5525 μm, and when the peak is so displaced, the filter rejects only a very small portion of the 1.5525 μm wavelength light passing through the core 12.

The temperature insensitivity of the fiber 10 as described above can be understood to mean that the time required for light of the given wavelength to move from one to another of two spaced points on the core remains constant despite temperature changes, and the inventors have discovered that such constancy of light transit time between spaced points 20 on the core 12 can be achieved by using certain dopants at certain concentrations in the core 12 and cladding 14. More particularly, the inventors have discovered that the temperature sensitivity of the fiber 10 can be varied by varying the relative concentrations of boron material in the core 12 and cladding 14, and that by relatively simple trial and error testing relative concentrations of boron material to use in the core 12 and cladding 14 can be found to use with a given selection and concentration of other dopants to make the fiber 10 temperature insensitive. In one aspect of the invention, the core of a fiber is essentially insensitive to changes in fiber temperature in that the time required for light of a given wavelength to move between two points on the core does not change by more than 0.001% for each 1° C. change in temperature over the temperature range of 20° C. to +50° C.

The method involves the step of first making a first test fiber having a core of first light conducting material including a silicon material doped with one or more dopants in given concentrations, and a cladding of second light conducting material immediately surrounding the core including a silicon material doped with one or more dopants of given concentration, with a boron material being a dopant included in either one or both of the core and cladding.

A test device, such as a filter, is then created in the test fiber and the test fiber is then tested at different temperatures to determine how a performance characteristic of the test device, such as, for example, the peak loss wavelength of the filter, changes with the temperature. Performance characteristic, as used herein, includes, for example, a transmission or reflection measurement wherein the performance of the different fibers at a selected wavelength or wavelengths can be compared.

A second test fiber is then prepared which is identical to the first test fiber except for the concentration of boron material included in at least one of the core and cladding being different from the concentration of boron in the first test fiber. A second test device is then created in the second test fiber and the fiber tested at different temperatures to determine how the performance characteristic, in this instance the peak loss wavelength of a Bragg filter, varies with the temperature.

Then, based on a comparison of the test results from the first and second test fibers, a third test fiber including a third test device is made which is similar to the first test fiber except for having the concentration of boron material in one or both of the core and cladding changed in such a way as to be likely to have the third test fiber be more temperature insensitive than either one of the first and second test fibers.

Then upon testing of the third fiber if its performance characteristic is found to be not sufficiently temperature insensitive the foregoing process is repeated with additional test fibers until relative concentrations for the boron material in the core and cladding yielding a satisfactory degree of temperature sensitivity have been determined.

In carrying out the above-described method, it is preferred that the boron material be contained only in the core, but it is also possible that the boron material may be contained only in the cladding or in both the core and the cladding.

As a result of carrying out the above-described method, it has been found that a photosensitive optical communication fiber having a satisfactory degree of temperature insensitivity over a wide range of practical temperatures is obtained if the core of the fiber includes a silicon oxide ($SiO_2$) doped with germanium dioxide ($GeO_2$) and boron trioxide ($B_2O_3$) and if the cladding layer immediately surrounding the core includes silicon dioxide ($SiO_2$) doped with phosphorous pentoxide ($P_2O_5$) and fluorine (F) with the preferred, more preferred, and most preferred concentrations of those materials being as given in the following table.

TABLE A

| | | Preferred Concentration | More Preferred Concentration | Most Preferred Concentration |
|---|---|---|---|---|
| CORE | $SiO_2$ | Remainder % | Remainder % | Remainder % |
| | $GeO_2$ | 4%–11% | 6%–10% | 7%–9% |
| | $B_2O_3$ | 1%–4% | 1.5%–3.5% | 2%–3% |
| CLADDING | $SiO_2$ | Remainder % | Remainder % | Remainder % |
| | $P_2O_5$ | 0.3%–1.2% | 0.5%–1.0% | 0.6%–0.9% |
| | F | 0.2%–1.2% | 0.4%–1.0% | 0.5%–0.8% |

The concentrations given in Table A are in mole percent, and a fiber according to the invention can include the concentrations of $GeO_2$, $B_2O_3$, $P_2O_5$ and F listed above in a $SiO_2$ host glass. Most preferably, a fiber according to the invention consists of the materials specified in the above table in the concentrations specified therein, i.e., the fiber includes these dopants exclusively. In many instances certain small amounts of undesired trace materials may also be included in the makeup of the core and cladding, but at levels that do not affect the fundamental properties of the fiber presented herein. These unavoidable small amounts have been omitted from Table A and may be considered to be part of the remainder mole percentage assigned to the silicon dioxide ($SiO_2$), such that a fiber according to the invention consists essentially of the materials listed in the above table in the concentrations specified therein.

At least in a fiber made using the most preferred concentrations of Table A, the transmission loss characteristic of long period filter made using the fiber is one wherein for a temperature change of from −10° C. to 40° C., the wavelength at which the peak transmission loss occurs does not vary by more than 10 picometers (10 pm).

Figure 4:
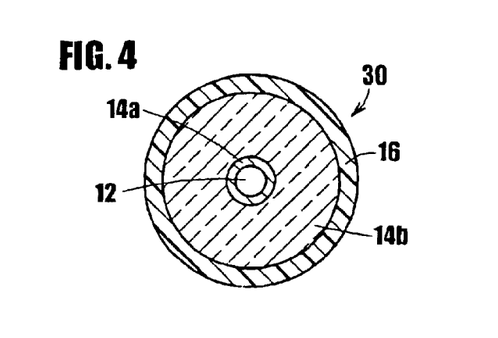
FIG. 4 is a transverse sectional view through a fiber comprising an alternate embodiment of the invention.

The invention may also be applied to a fiber such as shown at 30 in FIG. 4, which includes a core 12, an inner cladding 14a and an outer cladding 14b, and a protective polymer coating 16. In the case of the fiber 30, the core 12 has the same composition as the core 12 of FIG. 1, and the inner cladding 14a has the same composition of the cladding 14 of FIG. 1. In one instance, the outer cladding 14b can be included when the inner cladding 14a is to be used as a pump cladding. The outer cladding is of a lower index of refraction than the inner cladding 14a for confining light propagating in the inner cladding 14a to the inner cladding 14a.

The sizes of the core 12 in FIG. 1 and of the core 12 and inner core 14a in FIG. 4 have some influence on the temperature sensitivity of the fibers 10 and 30 and for that reason it is preferable that in both the fiber 10 of FIG. 1 and the fiber 30 of FIG. 4 the core 12 have a diameter of 6.5±1.0 µm and that in the fiber 30 of FIG. 4 the inner cladding layer 14a have a diameter of 30±8 µm.

In one aspect of the invention an optical fiber has utility in the making of various components of optical communication systems, and is especially of value in the making of long-period gratings. In the following description of the invention, the fiber of the invention is therefore taken to be one used in the making of a long-period grating, but in doing so there is no intention to limit the fiber of the invention to that specific application. The invention does, however, extend to long-period gratings and to methods for making fibers and long-period gratings.

Figure 5:
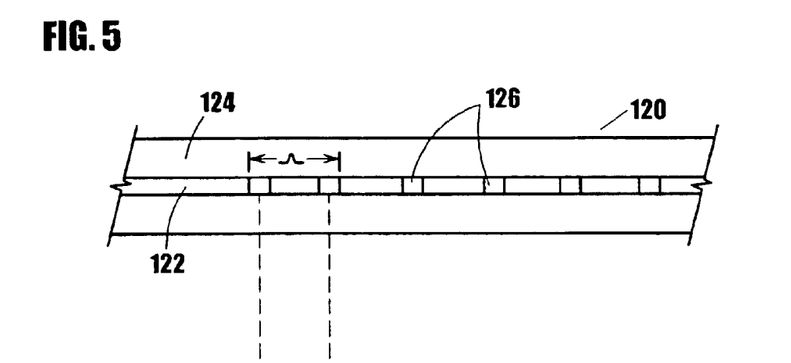
FIG. 5 is a view showing schematically a portion of a long-period grating made using an optical fiber embodying the invention.
Figure 6:
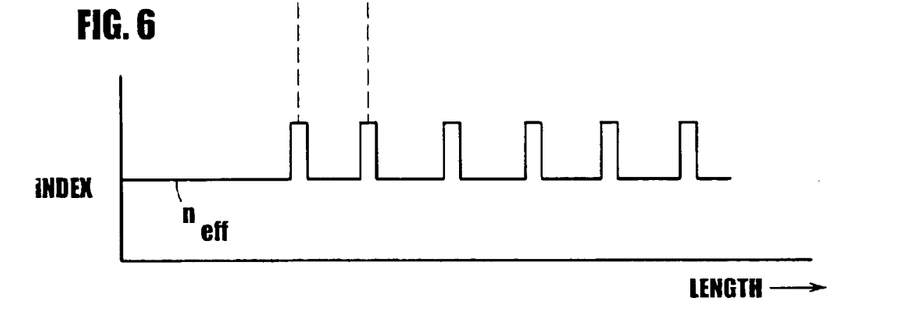
FIG. 6 is a view showing how the effective refractive index of the fiber of FIG. 5 varies along its length in the region of the grating.

Turning to FIG. 5, a portion of a fiber 120 embodying the invention is shown and includes a core 122 and a cladding 124. The core 122 is one which is doped with germanium or other suitable material to give it a photosensitive property allowing its refractive index to be changed locally by the application of ultraviolet light. In the fiber 120, the index of the core 122 has been changed at spaced locations along the length of the fiber to create index perturbations 126 in the core 122, which perturbations make up a series of spaced changes in the effective index of the fiber, as shown in FIG. 6, to cause the fiber to function as a long-period grating which attenuates, by radiation of light energy from the core to the cladding, light traveling through the core and having a wavelength falling within an attenuation band of wavelengths. A long-period grating made up of index perturbations 126 as shown in FIG. 5 generally includes a large number of such perturbations and only a few of them are shown in FIG. 5 for illustration purposes.

Figure 7:
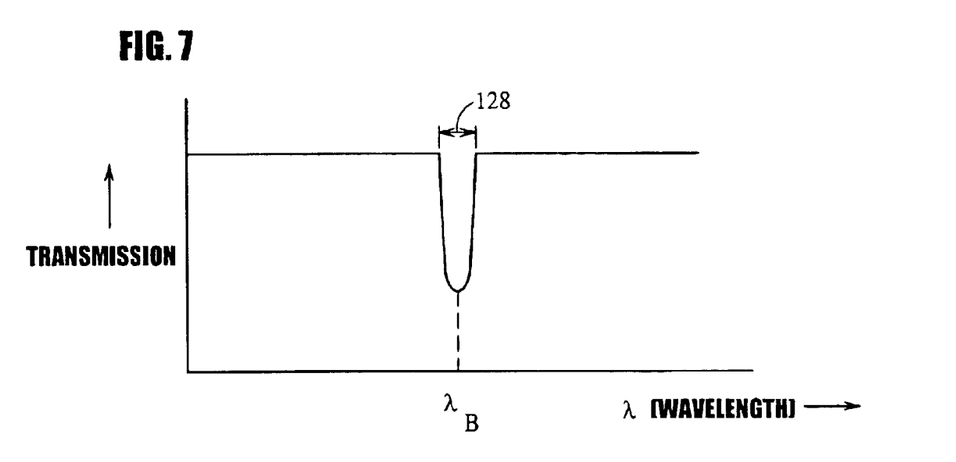
FIG. 7 is a diagram showing the transmission vs. wavelength characteristic curve of the FIG. 5 grating.

A characteristic curve of transmission vs. wavelength for a grating such as shown in FIG. 5 is shown in FIG. 7 with the curve having an attenuation band 128 with a peak transmission loss (peak attenuation) at a wavelength $\lambda_B$. The characteristic curve of FIG. 7 is that obtained when the involved fiber 120 is at a given fixed temperature. In the case of known conventional fibers, the wavelength $\lambda_B$ of a grating made from said fiber will typically vary significantly with changes in temperature. Consequently, if a grating is designed to have an attenuation band with a peak loss wavelength $\lambda_B$ of a specific value at a design temperature, if the operating temperature varies significantly from the design temperature the grating may no longer satisfactorily spectrally condition light passing through and beyond the grating.

In regard to the transmission vs. wavelength curve of FIG. 7, it is known from previous work in the field that the peak transmission loss wavelength $\lambda_B$ is very closely defined by the following equation:

$$\lambda_B = \Lambda [n_{core} - n_{clad}].$$ (Equation 1)

where $\Lambda$ is the periodicity of the grating perturbations 126, $n_{core}$ is the refractive index of the fiber's core material, and $n_{clad}$ is the refractive index of the fiber's cladding material.

The rate of change of the wavelength $\lambda_B$ with respect to temperature can therefore be closely obtained by differentiating Equation 1 with respect to temperature and dropping insignificant terms to arrive at the relationship:

$$\frac{d\lambda_B}{dT} = \Lambda \left[ \frac{dn_{core}}{dT} - \frac{dn_{clad}}{dT} \right].$$ (Equation 2)

From Equation 2, it can be seen that the rate of change of $\lambda_B$ with respect to temperature $$\left( \frac{d\lambda_B}{dT} \right)$$

can be made zero if $$\left( \frac{dn_{core}}{dT} \right)$$

is made to equal $$\left( \frac{dn_{clad}}{dT} \right).$$

Figure 8:
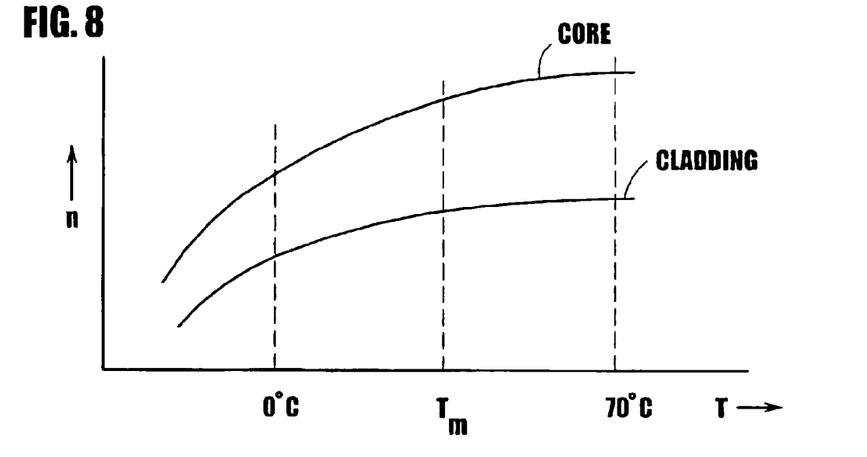
FIG. 8 is a diagram showing characteristic curves of index of refraction vs. temperature for the core and cladding materials of a typical fiber previously used for making optical communication system components, such as long-period gratings.
Figure 9:
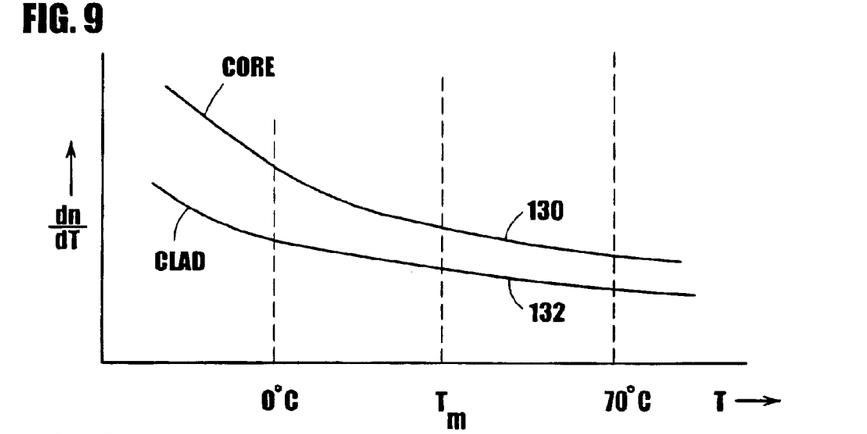
FIG. 9 is a diagram showing curves of dn/dT vs. temperature for the core and cladding materials represented by FIG. 8.

FIG. 8 shows characteristic curves of refractive index vs. temperature for the core and cladding materials of a typical prior art fiber used in the making of long period gratings and the like. For the fiber represented by FIG. 8, it can be seen, from inspection of the characteristic curves of FIG. 9, that at no one temperature within the range of 0° C. to 70° C. is the slope (dn/dT) of one curve the same as the slope dn/dT of the other curve, and therefore, in applying Equation 2, at no temperature between 0° C. and 70° C. is $$\frac{d\lambda_B}{dT}$$

equal to zero.

U.S. Pat. No. 5,703,978, U.S. Pat. No. 5,949,934, and U.S. Pat. No. 6,201,918 propose that the rate of change of $\lambda_B$ with respect to temperature $$\left( \frac{d\lambda_B}{dT} \right)$$

throughout a significant range of temperature be made equal or close to zero by controlling the make-up of the core and cladding materials so that their characteristic curves of index vs. temperature are, as shown for example in FIG. 5 of the '978 patent, of substantially identical shape. The above-mentioned article *Temperature Insensitive Long-Period Fiber Grating* is also concerned only with achieving a flattening of the $\lambda_B$ vs. T characteristic curve of a fiber over a large temperature range.

Applicants have found, however, that it is difficult, and perhaps impossible, to achieve an identical shaping of the characteristic curves of core and cladding indexes vs. temperature, and have further found that by careful formulation of the constituents making up the core and cladding materials, the first derivative curves of core and cladding indexes vs. temperature will cross one another, or will have a minimum difference, at a critical temperature, and that this critical temperature can be made to occur at different selected temperatures.

Curves of dn/dT vs. temperature over a reasonable range of temperatures for the core and cladding materials for one type of conventional fiber are approximately as shown by FIG. 9 That is, the curve 130 of the core material is located above the curve 132 of the cladding material and the two curves 130 and 132 do not cross one another within a reasonable range of temperatures, such as the illustrated temperature range of 0° C. to 70° C., at which a component made from the fiber would be expected to be used.

This means that at no given temperature within the temperature range of FIG. 9 is $$\frac{dn_{core}}{dT}$$

equal to $$\frac{dn_{clad}}{dT}$$

and, therefore, from Equation 2, at no illustrated temperature is the rate of change of $\lambda_B$ with respect to temperature, $d\lambda_B/dT$, equal or close to zero. From FIG. 9, it can be seen that the two curves 130 and 132 could be made to cross at a temperature within a practical temperature range if in FIG. 9 the curve 132 could be moved upwardly, the line 130 could be moved downwardly, or if at the same time the line 132 could be moved upwardly and the line 130 downwardly.

Figure 10:
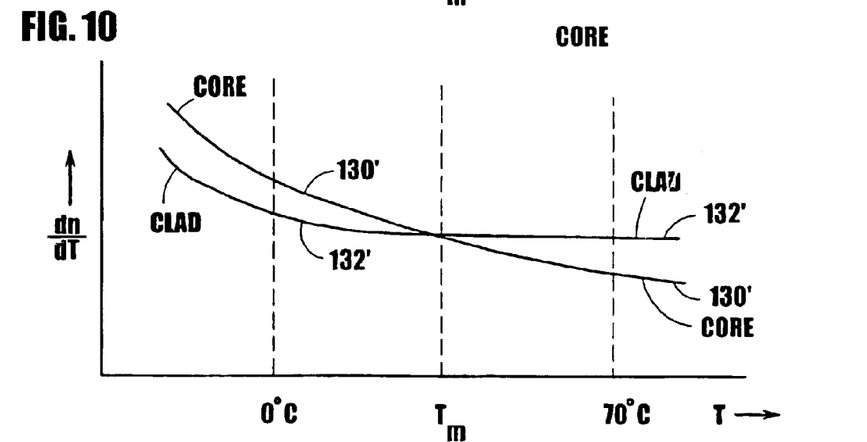
FIG. 10 is a view similar to FIG. 9, but showing dn/dT vs. temperature curves for the core and cladding materials of one fiber embodying the present invention.
Figure 11:
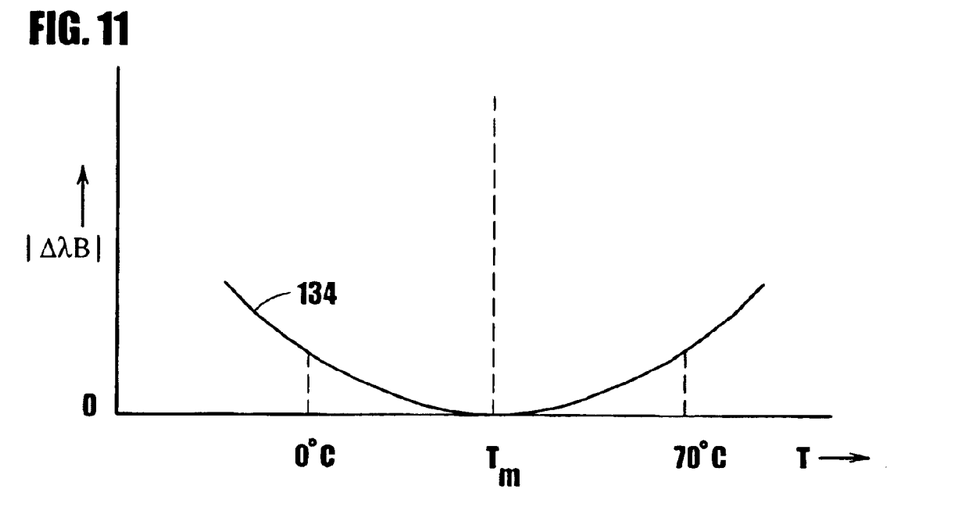
FIG. 11 is a diagram showing the absolute difference between the grating, or peak transmission loss, wavelength $\lambda_B$ at various temperatures and the peak transmission loss wavelength at the critical temperature $T_m$ for a long period grating made from a fiber embodying the invention.

FIG. 10 is similar to FIG. 9, but relates to a fiber embodying the invention so that the two curves 130' and 132' for the core and cladding materials, respectively, cross one another at a selected temperature $T_m$. If the rate of change of index with temperature for the core material and the rate of change of index with temperature for the cladding material is as shown by the lines 130' and 132' of FIG. 10, the absolute change of $\Delta\lambda_B$ at various temperatures from the value of $\Delta\lambda_B$ at temperature $T_m$ will be approximately as shown in FIG. 11 by the curve 134. From this FIGURE it is seen that to best suit the curve 134 to a practical given temperature range, such as the illustrated range of 0° C. to 70° C., it is desirable that the fiber be one whereby the Temperature $T_m$ is located approximately midway between the end points of the practical given temperate range, which for the illustrated range of 0° C. to 70° C. means that $T_m$ should fall at about the temperature of 35° C. In some cases it may be acceptable if $T_m$ falls anywhere within the practical temperature range of 0° C. to 70° C. However, it is more desirable to have $T_m$ fall within a narrower range, such as 30° C. and 40° C., and it is often still more desirable to have the low $T_m$ fall at or very close to one specific temperature, such as 35° C. An important advantage of the invention is the ability to make a fiber having a $T_m$ at a given preselected temperature or at least within a given preselected temperature range.

Inventors have discovered that by controlling the formulation of the core and the cladding materials of a fiber, even though these materials may have differently shaped curves of index vs. temperature, the two derivative curves $$\frac{dn_{core}}{dT}$$

and $$\frac{dn_{clad}}{dT}$$

can be made to cross one another, or to have a minimum difference, at a temperature $T_m$, where the rate of change of $\lambda_B$ with temperature is very low or essentially zero, falling within a range of temperatures at which it is expected that a component made from the fiber will be used, and further that the temperature $T_m$ can be made to be one which is preselected, with such preselected temperature being one, if wanted, falling approximately midway between the low and high temperatures of the expected temperature range of component use.

Methods for making a fiber and a long-period having the desired qualities described above are a part of the invention and are now described.

As the first step in the method, an initial determination is made of the rate of index change with changes in temperature (dn/dT) for constituents to be used in the core and cladding materials. For example, in the case of a fiber where the clad is to be made of silicon dioxide ($SiO_2$), phosphorus pentoxide ($P_2O_5$) and fluorine (F), and the core is to be made of silicon dioxide ($SiO_2$), germanium dioxide ($GeO_2$), and boron trioxide ($B_2O_3$), the involved rates of index change with the changes in temperature are taken from W. Vogel, *Optical Properties of Oxide Glasses*, Edited by D. R. Uhlman and N. J. Kriedl, 1991, page 19, and are as set out below in Table B. Note that F is listed as having a rate of index change of zero with respect to temperature in Table B, as data for F were not included in the foregoing Vogel reference. However, one of ordinary skill in the art, in light of the disclosure herein, will readily appreciate that any index change data for F can be taken into account as taught herein.

TABLE B

| Constituent | dn/dT |
|---|---|
| $SiO_2$ | 102 |
| $P_2O_5$ | -922 |
| F | 0 |
| $GeO_2$ | 194 |
| $B_2O_3$ | -300 |

Then approximate flat curves representing fixed values of dn/dT for both the core material and the cladding material can be gotten through the use of the following modeling equations:

$$\frac{dn_{core}}{dT} = \quad \text{(Equation 3)}$$

$$X_{C1} \cdot \frac{dn_{c1}}{dT} + X_{C2} \cdot \frac{dn_{C2}}{dT} + X_{C3} \cdot \frac{dn_{C3}}{dT} + \ldots + X_{Cn} \frac{dn_{cn}}{dT}$$

$$\frac{dn_{clad}}{dT} = \quad \text{(Equation 4)}$$

$$X_{D1} \cdot \frac{dn_{D1}}{dT} + X_{D2} \cdot \frac{dn_{D2}}{dT} + X_{D3} \cdot \frac{dn_{D3}}{dT} + \ldots + X_{D4} \frac{dn_{Dn}}{dT}$$

where $C_1$, $C_2$, $C_3$, ... $C_n$ are the constituents of the core material; $D_1$, $D_2$, $D_3$ ... $D_n$ are the constituents of the cladding material; and X equals the mole percent of the involved constituent in the involved core or cladding material.

Core and cladding materials are then formulated using Equations 3 and 4 to produce core and cladding materials having, from application of Equations 3 and 4, identical values of dn/dT. In making the formulations, for the core material the concentration of $SiO_2$ and $GeO_2$ are usually largely determined by other factors, and in the making of a cladding material the concentration of $SiO_2$ and of $P_2O_5$ are also largely determined by other factors, so that the most practical way of achieving core and cladding materials having identical dn/dT values, by use of Equations 3 and 4, is to vary the concentration of $B_2O_3$ in the core material.

However, in some cases it may be preferable to achieve equality of $$\frac{dn_{core}}{dT}$$

and $$\frac{dn_{clad}}{dT},$$

in accordance with Equations 3 and 4, by varying the concentration of $P_2O_5$ in the cladding material, or by varying both the concentration of $B_2O_3$ in the core material and the concentration of $P_2O_5$ in the cladding material.

After initial formulations for the core material and the cladding material are determined as described above using Equations 3 and 4 an actual fiber is made, by making a preform having regions of core material and cladding material, having such initial formulations, and drawing a fiber from the preform. Then a long-period grating is made from the fiber and the grating is tested to determine the effect of temperature changes on its response characteristics. From this testing it will be found that the grating has a curve of $|\Delta\lambda_B|$ vs. temperature, similar to the curve 134 of the FIG. 11, wherein the temperature $T_m$ has some distinct value. If the testing of the grating shows that its temperature $T_m$ is not equal or close to a preselected desired temperature, such as 35° C., a new fiber is then made by changing preferably only the concentration of $B_2O_3$ in the core material, or alternatively or additionally changing the concentration of $P_2O_5$ in the cladding material, in directions which can be expected to cause a grating using the new fiber to have a $T_m$ closer to the desired value; and this process can be repeated, if necessary, several times to arrive at a fiber having a $T_m$ at or acceptably close to the desired value. For example, increasing the concentration of material having a negative change of index of refraction with respect to temperature would lower the curve in FIG. 10 for that portion of the fiber (i.e., either the core or clad) having the increased concentration, and change the intersection point (and hence the $T_m$) of the core and clad curves, 130' and 132', respectively.

Figure 12:
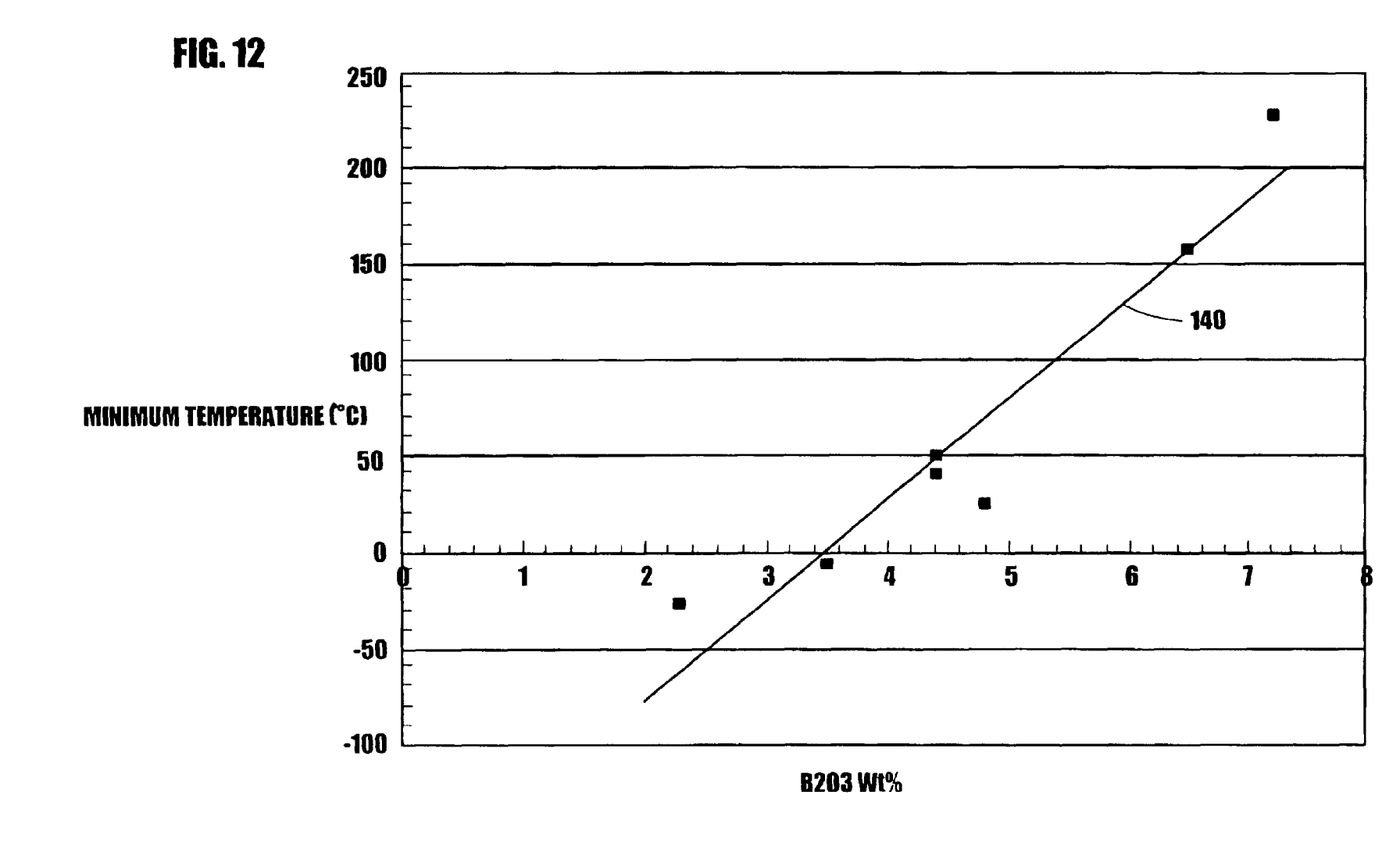
FIG. 12 is a graph mapping the relationship of measured $T_m$ to measured core $B_2O_3$ weight percentage concentration content for several exemplary fibers made by Inventors.

In connection with the making of a new fiber to have a $T_m$ which is closer to the desired or selected value for such characteristic, another aspect of applicants' invention is the finding by applicants that for a fiber having a cladding including $SiO_2$, $P_2O_5$, and F, and a core including $SiO_2$, $GeO_2$, and $B_2O_3$, if for a given length of fiber the weight amount of all of the mentioned constituents remain the same except for the weight amount of $B_2O_3$ in the core material, the value of $T_m$ for the fiber is almost directly related to the weight amount of $B_2O_3$ in the core material. Applicants fabricated several fibers which were closely identical to one another in regard to the weight amounts per unit length of $SiO_2$, $P_2O_5$, and F in the cladding and in regard to the amount of $SiO_2$ and $GeO_2$ in the core with the several fibers differing from one another only in regard to the amount of $B_2O_3$ per unit length in the core. (One of ordinary skill appreciates that although the weight amount of a first constituent may remain the same, in that none is added or subtracted from the prior amount, changing the amount of another constituent (e.g., $B_2O_3$) can cause a change in the weight percentages of both constituents.) These several fibers were carefully tested to determine the $T_m$ characteristic of each fiber, and FIG. 12 is a graph showing the measured $T_m$ for each of these several fibers in relation to the weight percentage of $B_2O_3$ in the fiber. Referring to FIG. 12, the line 140 represents a close linear fit of the test data taken from the several fibers and provides a good estimation of what weight percentages of $B_2O_3$ to use in the core of a fiber to achieve any desired $T_m$ for the fiber. For example, FIG. 12 shows that if it is desired to produce a fiber having a $T_m$ of 35° C. the core of the fiber should have a $B_2O_3$ weight percentage content of 4.1% with the fiber otherwise having essentially the same weight amounts of the other constituents of the cladding and core, per unit length of the fiber, as in the several fibers represented by FIG. 12.

In particular, each of the fibers of FIG. 12 had a cladding composition and a core composition made up, except for the weight percentage of $B_2O_3$ in the core, of the following constituents in the following ranges of weight percentage per unit length:

| Cladding | Core |
|---|---|
| $SiO_2$ - 98.3 to 97.6 wt. % | $SiO_2$ - 76.2 to 84.3 wt. % |
| $P_2O_5$ - 1.4 to 1.8 wt. % | $GeO_2$ - 13.5 to 16.5 wt. % |
| F - 0.3 to 0.6 wt. % | |

Weight percentages of $B_2O_3$ included in each of the cores of the several fibers are shown in the FIG. 12, where the squares represent data points corresponding to a different one of the several fibers. The weight percentage of $B_2O_3$ varies from 2.2 wt. % to 7.3 wt. %.

FIG. 12 also shows that if a fiber of the involved composition is to have a $T_m$ following between 0° C. to 70° C. the weight percentage of $B_2O_3$ in the core material should fall from 3.4 to 4.8. If it is desired that the $T_m$ fall between 30° C. and 40° C. the weight percentage of $B_2O_3$ in the core should fall from 4.0 to 4.2. If $T_m$ is to fall at approximately 35° C. the weight percentage of $B_2O_3$ in the core should be approximately 4.1.

As understood by one of ordinary skill in the art, gratings, such as long-period gratings, are often formed by selectively exposing a photosensitive optical fiber to actinic radiation, thereby creating spaced regions of the fiber wherein the index of refraction of the core is changed. However, gratings can be made by a variety of other techniques, such as, for example, using a microburner to thin spaced sections of an optical fiber or by acoustically exciting the fiber to create a standing or traveling wave.

In the above description of the invention and in the following claims the characteristic temperature $T_m$ is properly a feature of a long-period grating or other optical system device. However, for convenience, a fiber to be used in the making of such device is also sometimes referred to as having such feature. In the latter case, when a fiber is said to have a temperature $T_m$, what is meant is that if the fiber is used to make a device the device will have that characteristic temperature $T_m$.

A fiber according to the invention can comprise the constituents noted as above, preferably in the concentrations noted above. More preferably, a fiber according to the invention consists of the constituents noted above and in the concentrations noted above. However, as is known in the art, in many instances certain small amounts of undesired trace materials may be included in the makeup of the core and the cladding materials, but at levels that do not affect the fundamental properties of the fiber presented herein. These unavoidable small amounts have been omitted from the discussion and may be considered to be part of the $SiO_2$, such that a fiber according to the invention consists essentially of the materials and concentrations mentioned above.

A proviso is made to the foregoing, in that one of ordinary skill in the art understands that a fiber having a region that is said to consist or consist essentially of enumerated constituents that include $GeO_2$ and $SiO_2$ also includes some GeO, and that such GeO may be responsible for the photosensitive phenomenon.

Several embodiments of the invention have been described and illustrated herein. Those of ordinary skill in the art, in light of the disclosure herein, will readily envision a variety of other approaches for performing the functions and/or obtaining the results or advantages described herein. More generally, those skilled in the art would readily appreciate that all parameters, dimensions, materials and configurations described herein are meant to be exemplary and that actual parameters, dimensions, materials and configurations will depend on specific applications for which the teaching of the present invention are used. Each of such variations or modifications is deemed to be within the scope of the present invention. Those skilled in the art will recognize or be able to ascertain using no more than routine experimentation many equivalents to the specific embodiments of the invention described herein.

It is therefore to be understood that the foregoing embodiments are presented by way of example only and that within the scope of the appended claims and equivalents thereto, the invention may be practiced otherwise than as specifically described. For example, as noted above silica is the preferable host glass of the fiber cladding and/or core, to which other materials are added, such as germanium in the form of $GeO_2$, boron in the form of $B_2O_3$, and the others noted above, such as fluorine. As understood by one of ordinary skill, constituents may be present in different forms, especially in different host glasses. Use of the more general term, such as boron, means that the fiber in question includes boron, which may be present, for example, as $B_2O_3$ or as a different oxide. However, many other materials can be added to silica to affect the index of refraction, the rate of change of index of refraction with temperature, or the photosensitivity of the fiber. Known dopant materials used with silica include, but are not limited to, aluminum, phosphorus, titanium, tantalum, the rare earths (such as, for example, erbium, ytterbium and lanthanum) and the transition metals, which can be used to provide selected attenuation. In addition, other types of glass, such as, for example, chalcogenide glass, ZBLAN glass, phosphate glass, fluoride glass, germanium based glass and the like, as well as any of the single crystal or polycrystalline materials such as thallium bromoiodide, germanium, zinc selenide, antimony silicate and the like, may be found suitable for the host glass of the core or cladding of a fiber according to the invention. Photosensitive materials useful with at least silica, even in the absence of germanium, include Ce, Eu, aluminum, phosphorus and tantalum. Fluorozirconate fiber and silicon oxynitride fiber are also known to be photosensitive. By way of example, and not of limitation, an optical fiber according to the invention may comprise these or other materials, or variants thereof, singly or in combination in the core, cladding or other layers.

It will be understood that in the claims as well as in the specification above all transitional phrases such as "composing", "carrying", "having", "containing", "involving" and the like are understood to be open-ended. Only the transitional phrases "consisting of" and "consisting essentially of" shall be closed or semi-closed transitional phrases, respectively, as set forth in the U.S. Patent Office Manual of Patent Examining Procedure §2111.03, $7^{th}$ Edition, Revision 1.

We claim:

1. A long-period fiber grating for use in an optical communication system, said grating comprising:

an optical fiber having a core and a cladding, said core having refractive index perturbations spaced along a portion of its length whereby said fiber has a wavelength vs. transmission response with a transmission rejection band having a maximum transmission loss at a wavelength $\lambda_B$, at least one of said core and cladding including a first constituent having an index of refraction that decreases with an increase in temperature and a second constituent having an index of refraction that increases with the increase in temperature, a plot of the magnitude of the variation of $\lambda_B$ with temperature of said grating having a minimum tempeature sensitivity at a temperature $T_m$, and wherein $T_m$ is a temperature not in a first excluded temperature range from +15° C. to +25° C. and not in a second excluded temperature range from −5° C. to +5° C.

2. A long-period fiber grating as defined in claim 1, wherein:

said core has a refractive index $n_{core}$ and said cladding has a refractive index $n_{clad}$, which refractive indexes vary with temperature T and have characteristic rate of change curves of $$\left(\frac{dn_{core}}{dT} \text{ vs. } T\right)$$

and $$\left(\frac{dn_{clad}}{dT} \text{ vs. } T\right),$$

respectively, and which characteristic curves have a least difference between one another at the temperature $T_m$.

3. A long-period fiber grating as defined in claim 1, wherein:

said characteristic curves of $$\left(\frac{dn_{core}}{dT} \text{ vs. } T\right)$$

and $$\left(\frac{dn_{clad}}{dT} \text{ vs. } T\right)$$

cross one another at said temperature $T_m$.

4. A long-period fiber grating as defined in claim 1, wherein:

$T_m$ is greater than 25° C. and less than or equal to 45° C.

5. A long-period fiber grating as defined in claim 1, wherein:

$T_m$ is less than 68° C.

6. A long-period fiber grating as defined in claim 1, wherein:

$T_m$ is greater than 25° C.

7. A long-period fiber grating as defined in claim 1, wherein:
said $T_m$ is approximately 35° C.

8. A long-period fiber grating as defined in claim 1, wherein:
said first constituent comprises boron.

9. A long-period fiber grating as defined in claim 1, wherein:
said first constituent comprises phosphorous.

10. A long-period fiber grating as set forth in claim 1, wherein:
said core comprises $SiO_2$, $GeO_2$ and $B_2O_3$.

11. A long-period fiber grating as set forth in claim 10, wherein:
said cladding comprises $SiO_2$, $P_2O_5$, and F.

12. A long-period fiber grating as set forth in claim 1, wherein:
said core consists essentially of $SiO_2$, $GeO_2$ and $B_2O_3$.

13. A long-period fiber grating as set forth in claim 12, wherein:
said cladding consists essentially of $SiO_2$, $P_2O_5$, and F.

14. A long-period fiber grating for use in an optical communication system, said grating comprising:
an optical fiber having a core and a cladding, said core having refractive index perturbations spaced along a portion of its length whereby said fiber has a wavelength vs. transmission response with a transmission rejection band having a maximum transmission loss at a wavelength $\lambda_B$,
at least one of said core and cladding including a first constituent having an index of refraction that decreases with an increase in temperature and a second constituent having an index of refraction that increases with the increase in temperature,
a plot of the magnitude of the variation of $\lambda_B$ with temperature of said grating having a minimum at a temperature $T_m$,
wherein $T_m$ is a temperature not in a first excluded temperature range from +15° C. to +25° C. and not in a second excluded temperature range from −5° C. to +5° C.,
wherein said core consists essentially of 13.5 to 16.5 weight percentage $GeO_2$, 2.3 to 7.3 weight percentage $B_2O_3$, and a remainder of $SiO_2$, and
wherein said cladding consists essentially of 1.4 to 1.8 weight percentage $P_2O_5$, 0.3 to 0.6 weight percentage F, and a remainder of $SiO_2$.

15. A long-period fiber grating for use in an ontical communication system, said grating comprising:
an optical fiber having a core and a cladding, said core having refractive index perturbations spaced along a portion of its length whereby said fiber has a wavelength vs. transmission response with a transmission rejection band having a maximum transmission loss at a wavelength $\lambda_B$,
at least one of said core and cladding including a first constituent having an index of refraction that decreases with an increase in temperature and a second constituent having an index of refraction that increases with the increase in temperature,
a plot of the magnitude of the variation of $\lambda_B$ with temperature of said grating having a minimum at a temperature $T_m$,
wherein $T_m$ is a temperature not in a first excluded temperature range from +15° C. to +25° C. and not in a second excluded temperature range from −5° C. to +5° C.,
wherein said core consists essentially of 13.5 to 16.5 weight percentage $GeO_2$, approximately 4.1 weight percentage $B_2O_3$ and a remainder of $SiO_2$.

16. An optical fiber for use in making components of optical communication systems, said fiber comprising:
a core consisting essentially of 13.5 to 16.5 weight percentage $GeO_2$, 3.4 to 4.8 weight percentage $B_2O_3$, and a remainder of $SiO_2$; and
a cladding consisting essentially of 1.4 to 1.8 weight parts $P_2O_5$, 0.4 to 0.6 weight parts F, and the remainder $SiO_2$.

17. An optical fiber as defined in claim 16, wherein:
said core consists essentially of 13.5 to 16.5 weight percentage $GeO_2$, approximately 4.1 weight percentage $B_2O_3$, and a remainder of $SiO_2$.

18. A long-period fiber grating for use in an optical communication system, comprising:
an optical fiber having a core and a cladding, said core having refractive index perturbation spaced along a portion of the length whereby said fiber has a wavelength vs. transmission response with a transmission rejection band,
said core having a refractive index $n_{core}$ and said cladding having refractive index $n_{clad}$,
which refractive indexes vary with temperature T and have characteristic rate of change curves $$\left(\frac{dn_{core}}{dT} \text{ vs. } T\right)$$

and $$\left(\frac{dn_{clad}}{dT} \text{ vs. } T\right),$$

respectively, and,
which characteristic curves have a least difference between one another at a temperature greater than 25° C.

19. A long-period grating as defined in claim 18, wherein:
said characteristic curves have a least difference between one another at a temperature within the range of 25° C. to 45° C.

20. A long-period grating as defined in claim 18, wherein:
said characteristic curves have a least difference between one another at a temperature of approximately 35° C.

21. The method for making an optical fiber for use in making components of optical communication systems, said method comprising:
making a preform having a core region and a cladding region, at least one of the core region and cladding region having a weight percentage of a first constituent having an index of refraction that decreases with an increase in temperature and having a weight percentage of a second constituent having an index of refraction that increases with the increase in temperature,
drawing a fiber from the preform,
testing the fiber to determine a characteristic temperature $T_m$ at which a plot of the magnitude of the variation with respect to temperature of a response of a component made from the fiber has a minimum temperature sensitivity,
determining whether the determined $T_m$ falls within a selected temperature range,
if the determined $T_m$ for the fiber does not fall within the selected temperature range, making a new preform wherein a ratio of the weight percentage of the first constituent to the weight percentage of the second constituent is different from the ratio of the weight percentage of first constituent relative to the weight percentage of the second constituent in the preceding preform, drawing a new fiber from the new preform, testing the new fiber to determine its characteristic temperature $T_m$, and if the determined characteristic $T_m$ of the new fiber does not fall within the selected temperature range repeating the steps of making a new preform, drawing a new fiber, and testing the new fiber until arriving at a fiber having a characteristic $T_m$ falling within the selected temperature range.

22. The method of claim 21, wherein:

the first constituent comprises boron.

23. The method of claim 21, wherein:

the first constituent comprises phosphorus.

24. The method of claim 21, wherein:

said first constituent comprises $B_2O_3$, and when a $T_m$ determined for a fiber drawn from one preform falls below the selected temperature range, the next preform is made so that said core region has a higher weight percentage of $B_2O_3$ than the one preform.

25. The method of claim 21, wherein:

said first constituent comprises $B_2O_3$, and when a $T_m$ determined for a fiber drawn from one preform is above the selected temperature range, the next preform is made so that said region has a lower weight percentage of $B_2O_3$ than in the one preform.

26. The method of claim 21, wherein:

said desired temperature range is 0° C. to 70° C.

27. The method of claim 21, wherein said selected temperature range is 20° C. to 50° C.

* * * * *